United States Patent
Liu et al.

(10) Patent No.: US 12,045,935 B2
(45) Date of Patent: Jul. 23, 2024

(54) METHOD, ELECTRONIC DEVICE, AND COMPUTER PROGRAM PRODUCT FOR GENERATING TARGET OBJECT

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P, Round Rock, TX (US)

(*) Notice: Subject to any disclaimer, the term of this patent is extended or adjusted under 35 U.S.C. 154(b) by 71 days.

(21) Appl. No.: 17/981,766

(22) Filed: Nov. 7, 2022

(65) Prior Publication Data

US 2024/0127530 A1 Apr. 18, 2024

(30) Foreign Application Priority Data

Oct. 14, 2022 (CN) .......................... 202211258720.9

(51) Int. Cl.
*G06T 17/00* (2006.01)
*G01S 17/89* (2020.01)
(Continued)

(52) U.S. Cl.
CPC .............. *G06T 17/00* (2013.01); *G01S 17/89* (2013.01); *G06T 7/74* (2017.01); *G06T 19/20* (2013.01);
(Continued)

(58) Field of Classification Search
CPC ........... G06T 17/00; G06T 7/74; G06T 19/20; G06T 2200/08; G06T 2207/10028;
(Continued)

(56) References Cited

U.S. PATENT DOCUMENTS

2023/0075442 A1* 3/2023 Ma .......................... G06T 9/001

FOREIGN PATENT DOCUMENTS

CN 112184556 B * 10/2021 ........... G06N 3/0454

OTHER PUBLICATIONS

R. Li et al., "PU-GAN: A Point Cloud Upsampling Adversarial Network," IEEE International Conference on Computer Vision, Nov. 2019, pp. 7203-7212.
(Continued)

*Primary Examiner* — Wesner Sajous
(74) *Attorney, Agent, or Firm* — Ryan, Mason & Lewis, LLP (57) ABSTRACT

Embodiments of the present disclosure relate to a method, an electronic device, and a computer program product for generating a target object. The method includes upsampling a first feature of an input point cloud. The method further includes determining a reference feature of a reference point cloud having a predetermined shape. The method further includes determining a second feature based on the upsampled first feature and the reference feature. The method further includes generating a three-dimensional target object based on the second feature and the input point cloud, wherein the target object has a fitted curved surface, and the target object has a greater number of points than the input point cloud. With embodiments of the present disclosure, a point cloud of the target object can be made denser, and the number of points can be increased, thereby achieving a more accurate three-dimensional reconstruction of the target object.

20 Claims, 8 Drawing Sheets

(51) Int. Cl.
*G06T 5/60* (2024.01)
*G06T 7/73* (2017.01)
*G06T 19/20* (2011.01)
*G06V 10/46* (2022.01)
*G06V 20/64* (2022.01)

(52) U.S. Cl.
CPC .............. *G06T 2200/08* (2013.01); *G06T 2207/10028* (2013.01); *G06T 2210/56* (2013.01); *G06T 2219/2021* (2013.01)

(58) Field of Classification Search
CPC ......... G06T 2210/56; G06T 2219/2021; G06T 5/00; G06T 5/80; G06T 7/60; G06T 7/64; G06T 9/002; G06T 15/00; G06T 15/20; G01S 17/89; G06V 10/46; G06V 10/82–84; G06V 20/64; G06V 30/16; G06V 30/182
See application file for complete search history.

(56) References Cited

OTHER PUBLICATIONS

L. Yu et al., "PU-Net: Point Cloud Upsampling Network," IEEE Conference on Computer Vision and Pattern Recognition, arXiv:1801.06761v2, Mar. 26, 2018, 15 pages.

W. Yifan et al., "Patch-based Progressive 3D Point Set Upsampling," IEEE Conference on Computer Vision and Pattern Recognition, Jun. 2019, pp. 5958-5967.

Y. Qian et al., "PUGeo-Net: A Geometry-centric Network for 3D Point Cloud Upsampling," arXiv:2002.10277v2, Mar. 7, 2020, 17 pages.

L. Yu et al., "EC-Net: An Edge-aware Point Set Consolidation Network," European Conference on Computer Vision, Sep. 2018, 17 pages.

G. Metzer et al., "Self-Sampling for Neural Point Cloud Consolidation," ACM Transactions on Graphics, vol. 40, No. 5, Article 191, arXiv:2008.06471v3, May 13, 2022, 15 pages.

Y. Wang et al., "Deep Closest Point: Learning Representations for Point Cloud Registration," IEEE/CVF International Conference on Computer Vision, arXiv:1905.03304v1, May 8, 2019, 10 pages.

R. Hanocka et al., "Point2Mesh: A Self-Prior for Deformable Meshes," ACM Transactions on Graphics, vol. 39, No. 4, Article 126, arXiv:2005.11084v1, May 22, 2020, 12 pages.

Y. Ben-Shabat et al., "Nesti-Net: Normal Estimation for Unstructured 3D Point Clouds Using Convolutional Neural Networks," IEEE/CVF Conference on Computer Vision and Pattern Recognition, arXiv:1812.00709v1, Dec. 3, 2018, 13 pages.

Z.-S. Liu et al., "Image Super-Resolution via Attention based Back Projection Networks," IEEE International Conference on Computer Vision Workshop, arXiv:1910.04476v1, Oct. 10, 2019, 9 pages.

Y. Wang et al., "Dynamic Graph CNN for Learning on Point Clouds," ACM Transaction on Graphics, arXiv:1801.07829v2, Jun. 11, 2019, 13 pages.

U.S. Appl. No. 17/884,684 filed in the name of Zhisong Liu et al. on Aug. 10, 2022, and entitled "Point Cloud Processing Method and Electronic Device."

U.S. Appl. No. 17/940,733 filed in the name of Zhisong Liu et al. on Sep. 8, 2022, and entitled "Method, Electronic Device, and Computer Program Product for Processing Point Cloud."

* cited by examiner

METHOD, ELECTRONIC DEVICE, AND COMPUTER PROGRAM PRODUCT FOR GENERATING TARGET OBJECT

RELATED APPLICATION(S)

The present application claims priority to Chinese Patent Application No. 202211258720.9, filed Oct. 14, 2022, and entitled "Method, Electronic Device, and Computer Program Product for Generating Target Object," which is incorporated by reference herein in its entirety.

FIELD

Embodiments of the present disclosure relate to the field of computers, and more particularly, to a method, an electronic device, and a computer program product for generating a target object.

BACKGROUND

The metaverse is a new trend that provides users with virtual reality experiences. An important issue is whether a metaverse application can be used in a given location without excessive concern about computing and data access delays. In building the metaverse, it is important to have robust and efficient three-dimensional (3D) representations of objects in the real world. One possible approach is to scan objects in the real world using a high-performance hardware device to directly generate dense point clouds. However, such high-performance hardware devices can be unduly expensive. A more cost-effective solution is to sparsely record point clouds of objects by using an inexpensive hardware device with lesser performance, and then to use a computer vision technology (for example, deep learning) to increase the density of the sparsely recorded point cloud so as to achieve a denser point cloud providing a higher-resolution 3D representation of objects in the real world.

SUMMARY

Embodiments of the present disclosure provide a method, an electronic device, and a computer program product for generating a target object.

According to a first aspect of the present disclosure, a method for generating a target object is provided. The method includes upsampling a first feature of an input point cloud. The method further includes determining a reference feature of a reference point cloud having a predetermined shape. The method further includes determining a second feature based on the upsampled first feature and the reference feature. The method further includes generating a three-dimensional target object based on the second feature and the input point cloud, wherein the target object has a fitted curved surface, and the target object has a greater number of points than the input point cloud.

According to a second aspect of the present disclosure, an electronic device is further provided. The electronic device includes a processor and a memory coupled to the processor, wherein the memory has instructions stored therein, and the instructions, when executed by the processor, cause the electronic device to execute actions. The actions include upsampling a first feature of an input point cloud. The actions further include determining a reference feature of a reference point cloud having a predetermined shape. The actions further include determining a second feature based on the upsampled first feature and the reference feature. The actions further include generating a three-dimensional target object based on the second feature and the input point cloud, wherein the target object has a fitted curved surface, and the target object has a greater number of points than the input point cloud.

According to a third aspect of the present disclosure, a computer program product is provided, wherein the computer program product is tangibly stored on a non-transitory computer-readable medium and includes computer-executable instructions, and the computer-executable instructions, when executed by a device, cause the device to execute the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope.

During modeling of a target object in an environment, due to the limitation of hardware device resources, it is generally impossible to use a hardware device with quite high performance (for example, a high-performance laser radar (LiDAR)) to scan the target object directly to generate a point cloud that is dense enough. With the development of computer vision technology and improvement of processing capacity of computing resources, an effective solution is to sparsely record point clouds of an object by using a hardware device with common performance, and then use computer vision technology (for example, deep learning) to increase the density of the sparsely recorded point cloud, so as to more finely implement 3D reconstruction of an object in the real world. In conventional techniques, the processed point cloud is inaccurate due to the presence of a large amount of noise in the actual environment, thus resulting in a poor effect of the 3D reconstructed target object.

In order to overcome the above disadvantages, embodiments of the present disclosure provide a solution for generating a target object. In this solution, a reference point cloud of a reference object is taken as a reference, features of a point cloud of a target object are learned, and the learned features are used to deform the reference point cloud into the shape of the target object. In addition, 3D reconstruction of the target object is performed directly based on the obtained denser point cloud. Since the reference point cloud is not affected by noise and the number of points thereof is greater than the number of points of the point cloud of the target object, a better 3D reconstruction effect of the target object can be achieved.

Figure 1:
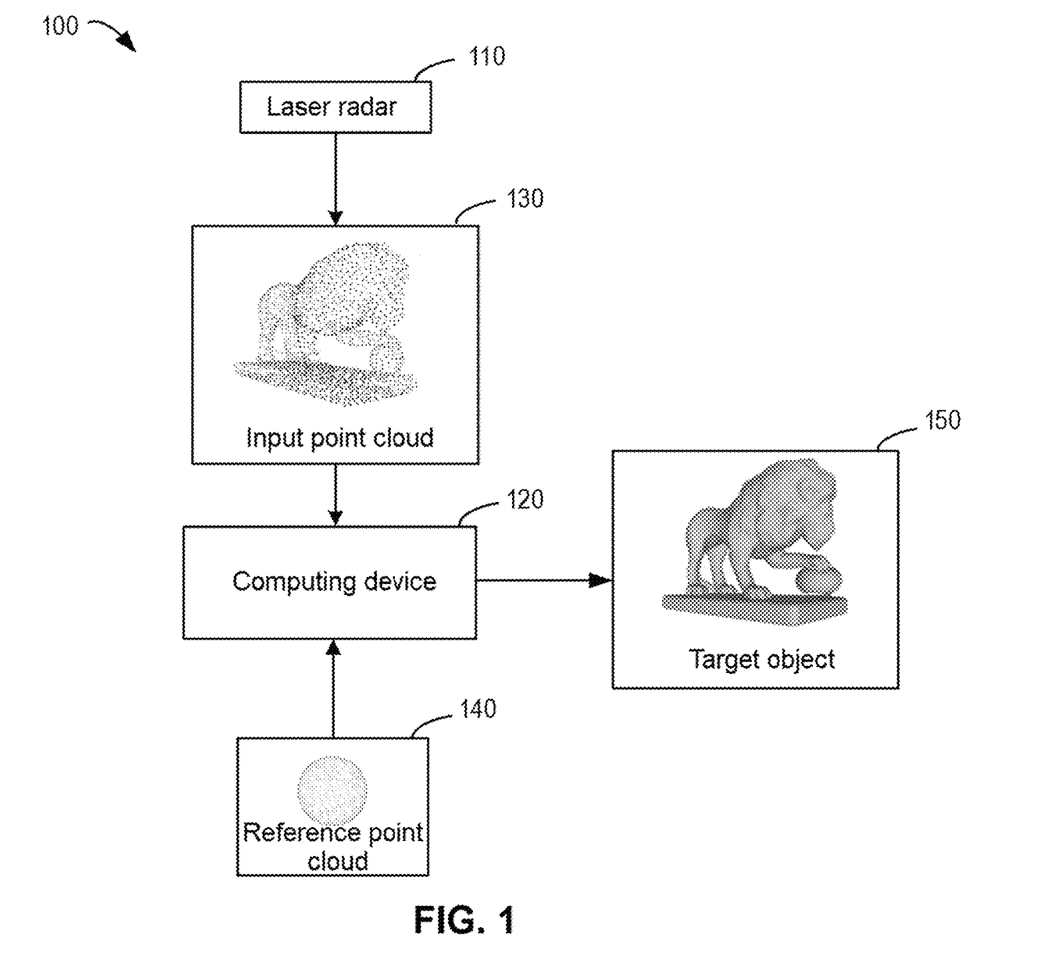
FIG. 1 shows a schematic diagram of an example environment in which embodiments of the present disclosure may be implemented.

FIG. 1 shows a schematic diagram of example environment 100 in which embodiments of the present disclosure can be implemented. As shown in FIG. 1, example environment 100 may include laser radar 110. Laser radar 110 may scan an object in the environment so as to generate a point cloud. Point cloud refers to a collection of sets of vectors in a three-dimensional coordinate system. A point cloud is typically obtained from scanning by a laser radar and may be interpreted as the intensity of reflected echoes of an object to the laser radar, which reflects the three-dimensional shape of the object and its position in the environment. Certainly, the method of the present disclosure may directly use an obtained point cloud, so laser radar 110 is not always necessarily included in example environment 100, and the point cloud may also be obtained by using other hardware devices.

Computing device 120 is further included in environment 100. Computing device 120 may be, for example, a computing system or a server. Computing device 120 may receive the point cloud of the target object from laser radar 110 or acquire sparse input point cloud 130 of the target object directly via other means. Computing device 120 may generate 3D reconstructed target object 150 using the method of the present disclosure based on input point cloud 130 and reference point cloud 140 of a predetermined reference object.

It should be understood that an architecture and functions of example environment 100 are described for illustrative purposes only, without implying any limitation to the scope of the present disclosure. Embodiments of the present disclosure may also be applied to other environments having different structures and/or functions.

As shown, input point cloud 130 is actually 3D modeling data of an object. Input point cloud 130 may represent 3D modeling data of an animal (for example, a lion), or input point cloud 130 may also represent modeling data of a building, a plant, and the like, which is not limited in the present disclosure. It can be seen that the point cloud in input point cloud 130 is relatively sparse, so many details cannot be embodied well, which brings about negative effects on subsequent application (for example, virtual reality).

Reference point cloud 140 is a reference point cloud of a pre-determined reference object. The reference object may be a standard sphere, so its reference point cloud is also a uniform spherical point cloud. "Uniform" means that distances between each point in the spherical point cloud and its adjacent points are equal. It can be understood that reference point cloud 140 may also be in other shapes, which is not limited in the present disclosure. It can be understood that the number of points in reference point cloud 140 in some embodiments is required to be greater than the number of points in input point cloud 130. Here, N is used to represent the number of points in the input point cloud, and each such point may be more particularly represented with three-dimensional coordinates, so the number of points in the input point cloud is N×3. It can be understood that reference point cloud 140 may have the number of points of αN×3, where parameter a is greater than 1, as the number of points of reference point cloud 140 in some embodiments is required to be greater than the number of points of input point cloud 130. It can be understood that the laser radar used in the present embodiment may be a laser radar with common performance, and how many times the number of points of the input point cloud is increased (for example, being interpolated) may be controlled using the parameter a, so that hardware costs can be reduced.

A process according to embodiments of the present disclosure will be described in detail below with reference to FIG. 2 to FIG. 9. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 2:
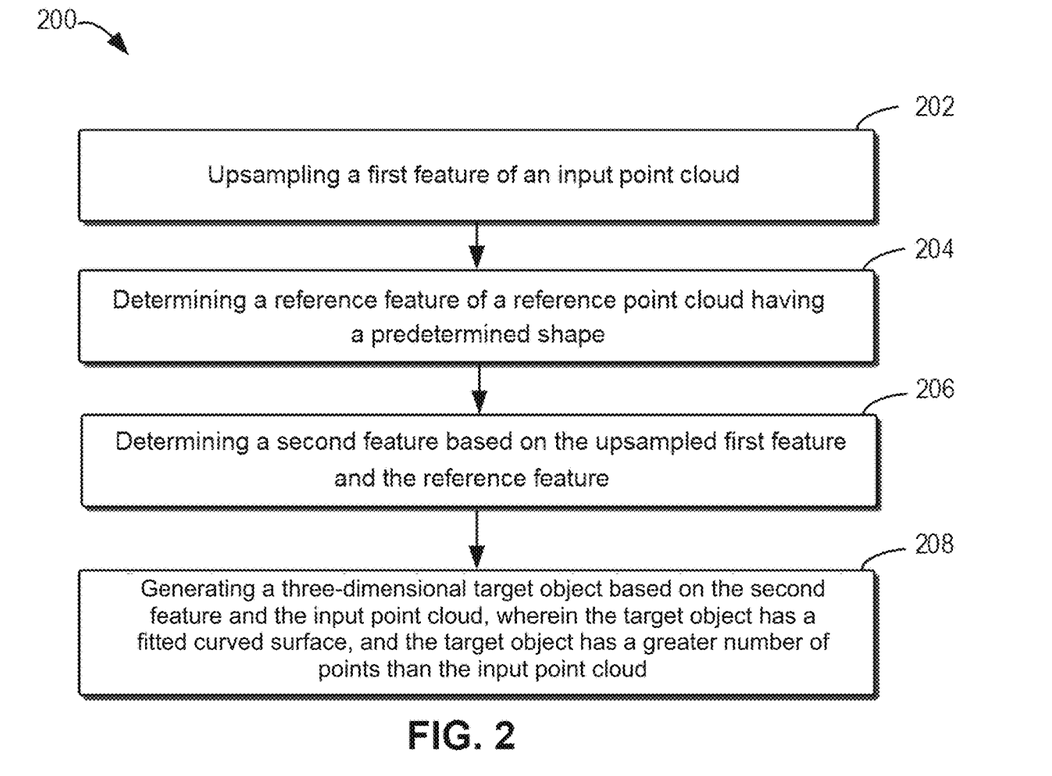
FIG. 2 shows a flow chart of a method for generating a target object according to an example implementation of the present disclosure.

FIG. 2 shows a flow chart of method 200 for generating a target object according to an example implementation of the present disclosure. At block 202, a first feature of an input point cloud is upsampled. For example, a first feature of input point cloud 130 of a target object 150 is upsampled. It can be understood that, in a deep learning model, feature is an abstract concept and does not necessarily correspond to some physical meaning(s) of the target object. For the sake of convenience, a feature related to the target object is called the first feature. It can be understood that if F is used to represent the dimension of a feature specific to each point cloud (for example, representing the length of the number of bits of the feature), the dimension of the first feature is N×F. It can be understood that the dimension of a reference feature of a reference point cloud of a reference object is αN×F.

In some embodiments, the first feature may be determined in the following manner: scanning the target object by a hardware device to acquire input point cloud 130; and determining the first feature based on input point cloud 130 and using a convolution layer in a machine learning model. As an example, the machine learning model may be a trained deep learning model, and this deep learning model generates the first feature based on input point cloud 130. In some embodiments, the hardware device may include a laser radar. An example implementation of determining the first feature will further be illustrated below in conjunction with FIG. 5.

In some embodiments, upsampling a first feature of input point cloud 130 of a target object 150 includes: sampling the first feature multiple times so that the dimension of the first feature can be the same as the dimension of the reference feature. As an example, the first feature may be sampled multiple times, so that the dimension of the upsampled first feature (also referred to as an upsampled feature) reaches αN×F, namely, being the same as the dimension of the reference feature. As for the process of implementing upsampling, an example implementation of upsampling will be described below with separate reference to FIG. 6 and FIG. 7.

At block 204, a reference feature of a reference point cloud having a predetermined shape is determined. For example, a reference feature of reference point cloud 140 of the reference object is determined. The reference object is a predetermined regular object, for example, a standard sphere. Thus, the reference point cloud of the reference object is a uniform spherical point cloud, and distances between each point in the spherical point cloud and its adjacent points are equal. The number of points of the reference point cloud may be αN×3, i.e., the number of points that the point cloud of target object 150 may have.

In some embodiments, the reference feature may also be determined based on reference point cloud 140 and using a convolution layer in a machine learning model, which is similar to the manner of acquiring the first feature. As an example, the machine learning model may be a trained deep learning model, and this deep learning model generates the reference feature based on reference point cloud 140. It can be understood that the dimension of the reference feature is αN×F.

At block 206, a second feature is determined based on the upsampled first feature and the reference feature. It can be understood that the dimensions of both the upsampled feature and the reference feature are αN×F and the two will both be input into the deep learning model to determine the second feature, and the dimension of the second feature is αN×3. The second feature may be understood as a motion vector that "deforms" the shape of the reference object to the shape of the target object by indicating how the reference point cloud moves. With respect to the process of determining the second feature, an example implementation of determining a second feature will be described below with separate reference to FIG. 8.

At block 208, a three-dimensional target object is generated based on the second feature and the input point cloud, wherein the target object has a fitted curved surface, and the target object has a greater number of points than the input point cloud. For example, target object 150 is generated based on the second feature and reference point cloud 140. The number of points of target object 150 is αN×3, which is the same as the number of points of reference point cloud 140.

In this way, the effect of increasing the N points in input point cloud 130 of the target object to αN points of the point cloud of target object 150 is achieved. In addition, method 200 can also implement the 3D reconstruction of the target object directly based on the point cloud of which the number of points is increased. With embodiments of the present disclosure, the point cloud of the target object can be made denser, and the increased point cloud can be made accurate enough, so that the description of the target object is finer and the effect of 3D reconstruction is better.

Figure 3:
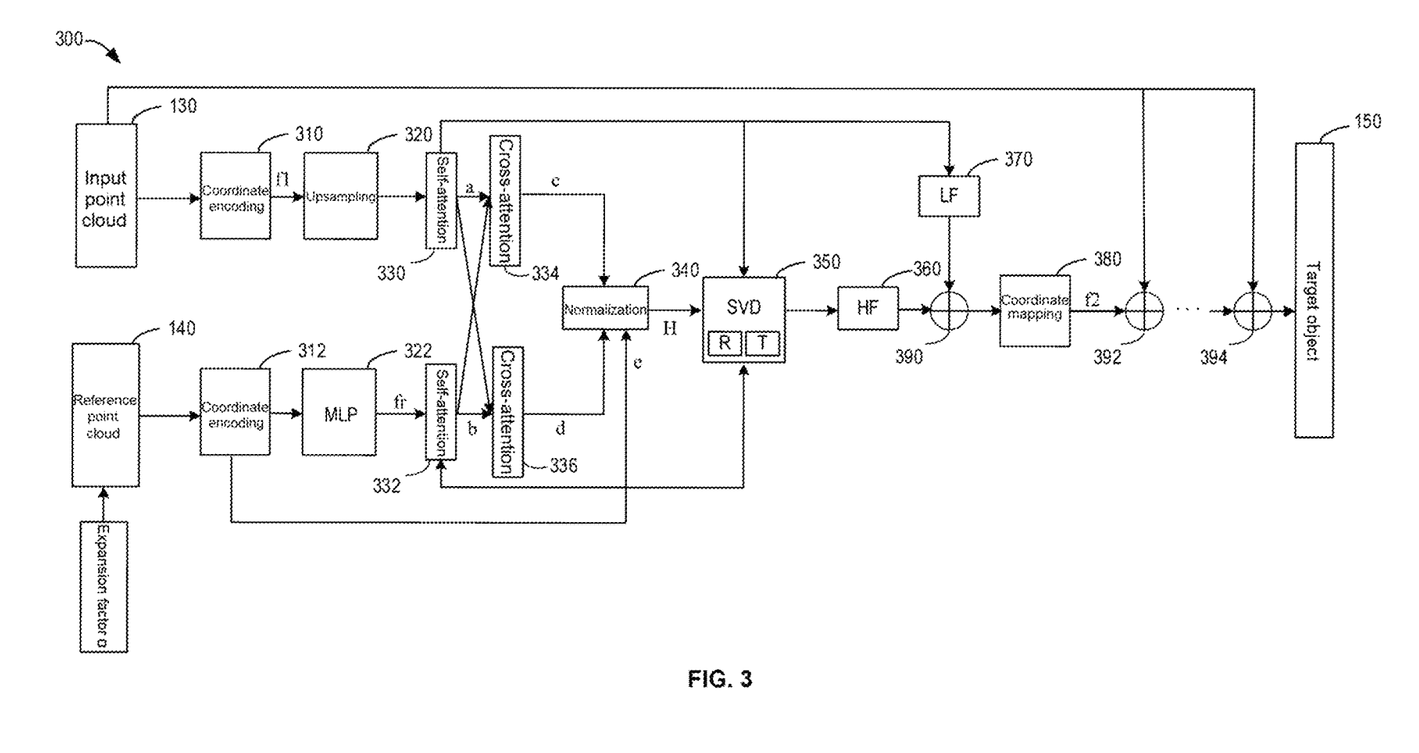
FIG. 3 shows a schematic diagram of a deformation model for generating a target object according to an example implementation of the present disclosure.

FIG. 3 shows a schematic diagram of deformation model 300 for generating a target object according to an example implementation of the present disclosure. The steps of block 202 in FIG. 2 may be configured to be implemented at block 320 in FIG. 3. Specifically, input point cloud 130 is input to block 310 for encoding. This encoding is a type of characterization, for example, converting the coordinate relationship of input point cloud 130 in space into the first feature f1 via a one-dimensional convolution layer. The first feature is input to block 320 for upsampling, so that an upsampled first feature can be obtained.

The steps of block 204 of FIG. 2 may be configured to be implemented at block 312 and block 322 of FIG. 3 so as to determine the reference feature. Specifically, reference point cloud 140 may be input to block 312 for encoding. Similarly, this encoding is a type of characterization, for example, converting the coordinate relationship of reference point cloud 140 in space into a vector representation via a one-dimensional convolution layer. This vector representation may be input to a fully connected layer in block 322 for feature extraction, so that the reference feature fr can be obtained. It is worth noting that the number of points in the reference point cloud may be initialized according to an expansion factor α, that is, the number of points of the reference point cloud may be obtained by multiplying α by the number of points of input point cloud 130.

The steps of block 206 in FIG. 2 may be configured to be implemented at block 330, block 332, block 334, block 336, block 340, block 350, block 360, block 370, and block 380 so as to determine the second feature. Specifically, the upsampled feature may be input to block 330 to generate feature vector a (also referred to as a first intermediate feature) using a self-attention mechanism. In parallel or sequentially, reference feature fr may be input to block 332 to generate feature vector b (also referred to as a second intermediate feature) using the self-attention mechanism.

At block 334, vector a and vector b may be acquired, and vector c may be generated using a cross-attention mechanism. In some embodiments, vector b may be used as a query vector. At block 336, vector b and vector a may be acquired, and vector d may be generated using the cross-attention mechanism. In some embodiments, vector a may be used as a query vector.

At block 340, the combination of vector c, vector d, and vector e may be normalized, and vector matrix H (also referred to as a third intermediate feature) may be generated. In some embodiments, vector e may be from the output of block 312, i.e., the result of convolutional encoding of the coordinates of the reference point cloud. In some embodiments, vector matrix H may be equal to the result of normalization of the combination e×(c×d).

At block 350, based on vector a from block 330, vector matrix H may be subjected to singular value decomposition (SVD), and first parameter set R and second parameter set T may be obtained. At block 360, feature encoding of high-frequency features may be performed based on first parameter set R and second parameter set T to determine a high-frequency feature. At block 370, feature encoding of low-frequency features may be performed based on vector a from block 330 to determine a low-frequency feature. With respect to the process of determining the high-frequency feature, an example implementation of determining a high-frequency feature will be described below with separate reference to FIG. 9.

At block 390, the low-frequency feature may be combined with the high-frequency feature. At block 380, coordinate mapping may be performed on the combination of the low-frequency feature and the high-frequency feature, and second feature f2 may be generated.

The step of block 208 may be configured to be implemented at block 392, and at block 392, second feature f2 is combined with input point cloud 130 to determine a three-dimensional target object. It is worth noting that method 200 may be performed iteratively to optimize the effect of the obtained three-dimensional target object 150. For example, block 310 to block 380 of deformation model 300 discussed previously may be repeated at block 394.

Figure 4:
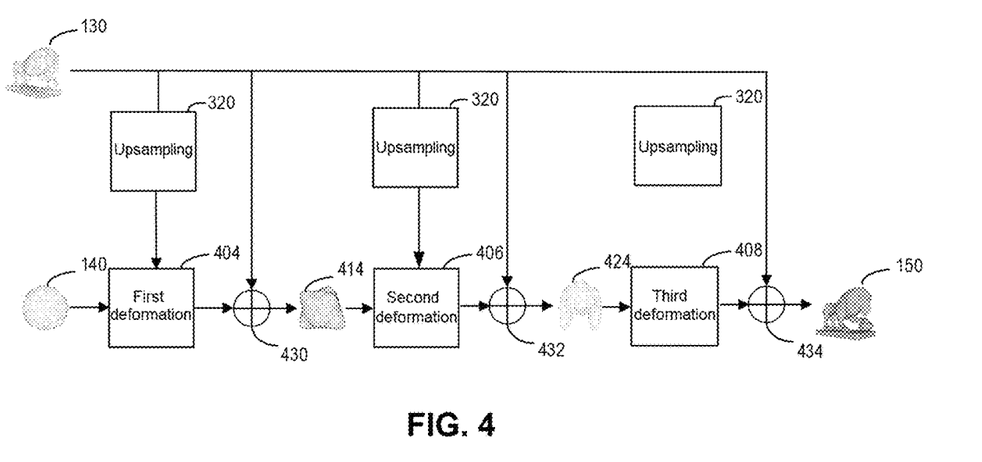
FIG. 4 shows a block diagram of iteration of a method for generating a target object according to an example implementation of the present disclosure.

FIG. 4 shows a block diagram of iteration 400 of method 200 for generating a target object according to an example implementation of the present disclosure. In some embodiments, an iterated target object may also be generated based on the upsampled feature and the point cloud of target object 150, wherein the iterated target object and the previous target object have the same or different numbers of points in their respective point clouds. Specifically, as shown in FIG. 4, the steps in blocks 202 to 208 of method 200 may be collectively referred to as "deformation."

After first deformation 404 and via block 430, the result of the first deformation, i.e., intermediate object 414, can be obtained. In the case where intermediate object 414 has a shape preliminarily similar to the input point cloud but the target effect is not satisfied, intermediate object 414 may be subjected to second deformation 406, and the result of the second deformation, i.e., intermediate object 424, can be obtained via block 432. In the case where intermediate object 424 has a shape more similar to the input point cloud but the target effect is not yet satisfied, intermediate object 424 may be subjected to third deformation 408, and the result of the third deformation, i.e., target object 150, can be obtained via block 434. In some embodiments, if any of the intermediate objects is deemed to satisfy the requirement and can be output, it may also be output as target object 150.

Certainly, the number of deformations (namely, the number of iterations of method 200) is not limited in the present disclosure. It can be understood that such process may be repeated multiple times so as to achieve a better deformation effect. Starting from the second deformation process, the reference point cloud, which serves as a reference, is the point cloud of the target object after a previous deformation, so this point cloud is more similar to the target object. Thus, it may be repeated multiple times as needed so as to achieve a better effect. As an example, the iteration is stopped when the difference (e.g., edge difference, texture difference, and normal line difference) between the point cloud of target object 150 after a particular deformation and input point cloud 130 is detected to be less than a threshold.

Figure 5:
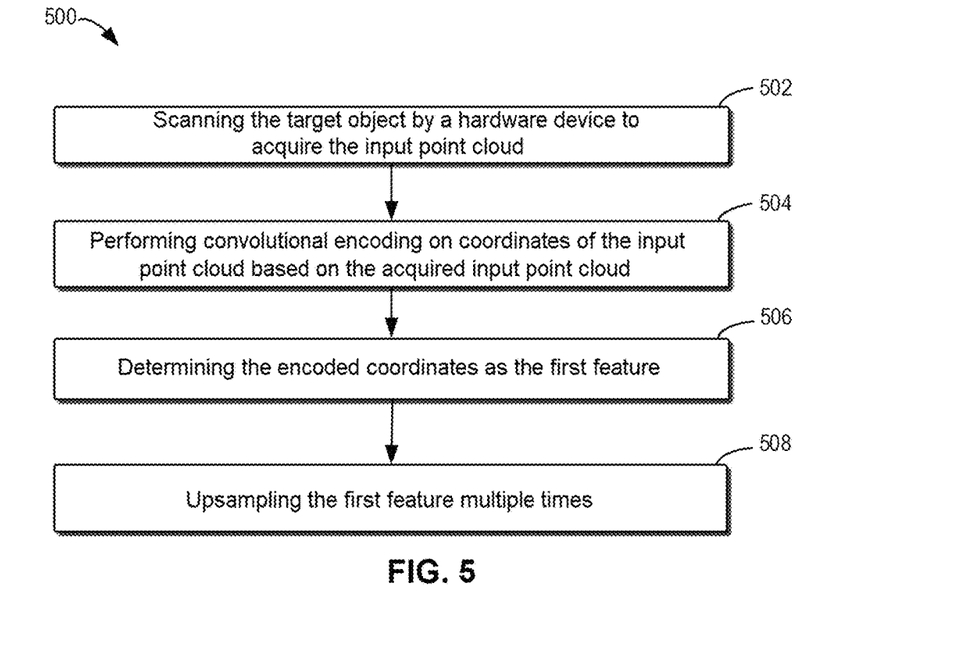
FIG. 5 shows a flow chart of a process for determining a first feature according to an example implementation of the present disclosure.

FIG. 5 shows a flow chart of process 500 for determining a first feature according to an example implementation of the present disclosure. At block 502, a target object is scanned by a hardware device to acquire an input point cloud. For example, a lion statue may be scanned by a laser radar to acquire input point cloud 130. At block 504, convolutional encoding may be performed on the coordinates of the input point cloud based on the acquired input point cloud. For example, the coordinates of the point cloud are converted into a feature vector using a convolution layer.

At block 506, the encoded coordinates may be determined as a first feature. For example, the feature vector of the coordinates of the point cloud is used as the first feature. At block 508, the first feature may be upsampled multiple times.

Figure 6:
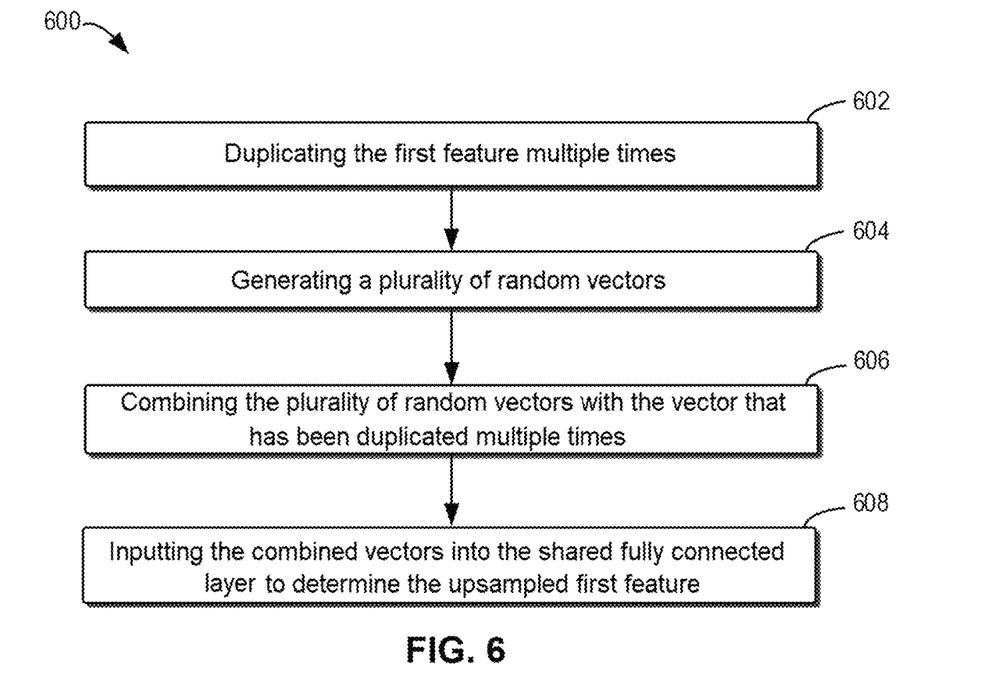
FIG. 6 shows a flow chart of an upsampling process according to an example implementation of the present disclosure.
Figure 7:
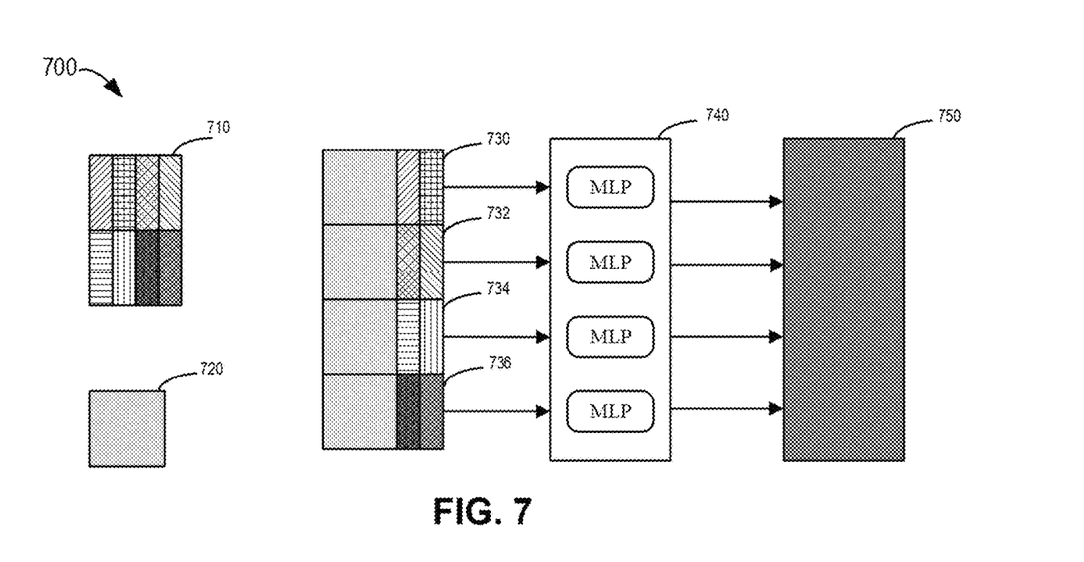
FIG. 7 shows a schematic diagram of an upsampling process according to an example implementation of the present disclosure.

FIG. 6 shows a flow chart of upsampling process 600 according to an example implementation of the present disclosure. FIG. 7 shows a schematic diagram of upsampling process 700 according to an example implementation of the present disclosure. The upsampling process 600 or process 700 will be described below in conjunction with FIG. 6 and FIG. 7, where process 600 and process 700 are the same or similar processes.

At block 602, the first feature may be duplicated multiple times (for example, a times) so as to obtain a vector with a dimension of $\alpha N \times F$. For example, first feature 520 may be duplicated 4 times ($\alpha=4$) to obtain a $\alpha N \times F$ vector.

At block 604, random vectors may be generated. For example, N random vectors with a dimension of 2 are generated, where each of the random vectors may be generated randomly. For example, 8 random vectors with a dimension of 2 may be generated, as shown in vector set 710.

At block 606, the plurality of random vectors may be combined with the vector that has been duplicated multiple times at block 602. For example, each first feature 720 is combined with 2 random vectors to obtain vector 730, vector 732, vector 734, and vector 736.

At block 608, the combined vectors may be input into shared fully connected layer 740 to determine upsampled feature 750. For example, vector 730, vector 732, vector 734, and vector 736 are input into fully connected layer 740 to acquire upsampled feature 750.

Upsampled feature 750 determined in this way has a dimension of $\alpha N \times F$, which facilitates participation in the subsequent process. In the meantime, it can be more efficient and flexible to use a dedicated module such as block 320 in FIG. 3 to acquire the upsampled feature. For example, when needed, a model may be especially trained for some categories, for example, separately trained for processing buildings, animals, and the like, and other modules are trained similarly.

Figure 8:
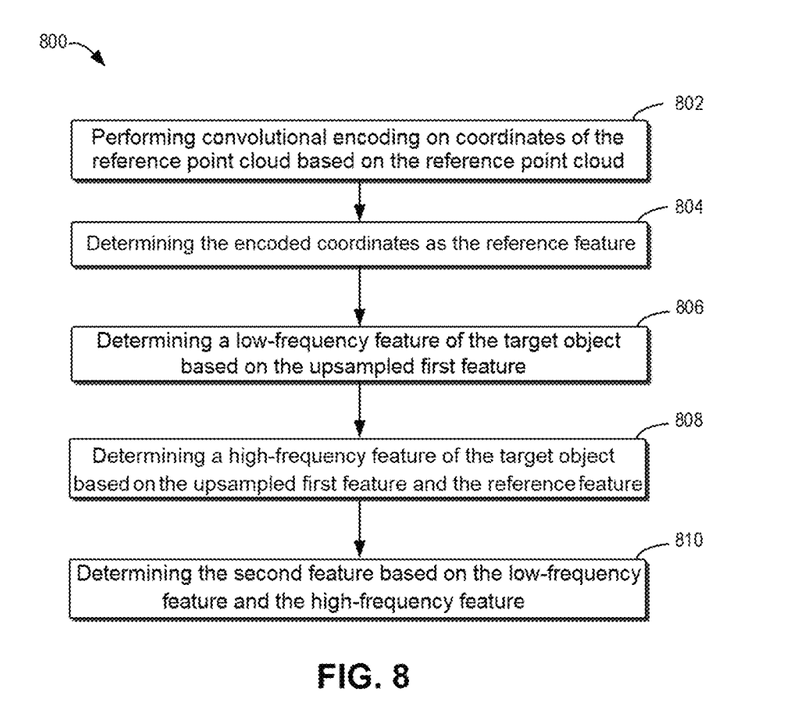
FIG. 8 shows a flow chart of a process for determining a second feature according to an example implementation of the present disclosure.
Figure 9:
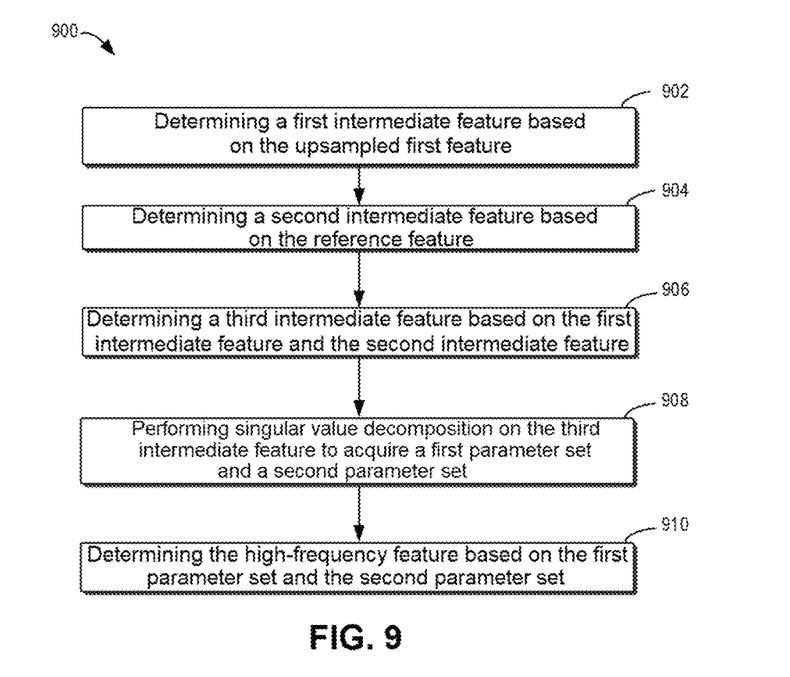
FIG. 9 shows a flow chart of a process for determining a high-frequency feature according to an example implementation of the present disclosure.

FIG. 8 shows a flow chart of process 800 for determining a second feature according to an example implementation of the present disclosure. FIG. 9 shows a flow chart of process 900 for determining a high-frequency feature according to an example implementation of the present disclosure. Process 800 for determining a second feature will be described below in conjunction with FIG. 3, FIG. 8, and FIG. 9.

First, principles of the present disclosure, such as the reason for introducing the second feature, are described in general. As illustrated in FIG. 3, the point cloud upsampling framework provided in embodiments of the present disclosure uses uniform circle (sphere) reference point cloud 140 initialized based on expansion factor α as a starting point. Deformation model 300 is used to learn to convert reference point cloud 140 to be close to input point cloud 130 but with more points. The more deformation processes there are, the better 3D reconstruction can be obtained. The overall deformation concept of deformation module 300 is to extract rigid motion (rotation and translation) from the correlation between two points by using singular value decomposition. Specifically, two sets of points $X=x_1, x_2, \ldots, x_N \in R^3$ (input point cloud), and $Y=y_1, y_2, \ldots, y_M \in R^3$ (reference point cloud) are given. For the convenience of marking, the simplest case is considered, where M=N. The method described in the present disclosure can be easily expanded to the case where M≠N.

The rigid transformation is denoted as $[R_{XY}, t_{XY}]$ (rotation and translation vectors), where $R_{XY} \in SO(3)$ (three-dimensional) and $t \in R^3$. If X and Y are ordered in the same way and it is expected that the mean square error $E(R_{XY}, t_{XY})$ be minimized, it may be written as shown in Equation (1):

$$E(R_{XY}, t_{XY}) = \frac{1}{N} \sum_{i}^{N} \|R_{XY}x_i + t_{XY} - y_i\|^2 \quad (1)$$

The solving of this minimized mean square error can be conducted using the iterative closest point (ICP) algorithm. To avoid costly iterative computations, the hidden main vector can be explored by computing a cross-covariance matrix so as to perform transformation, thus enabling a one-step operation. For example, this can be conducted using Equation (2):

$$H = \sum_{i=1}^{N}(x_i - \bar{x})(y_i - \bar{y})^T \quad (2)$$

$$\text{where } \bar{x} = \frac{1}{N}\sum_{i=1}^{N} x_i, \quad \bar{y} = \frac{1}{N}\sum_{i=1}^{N} y_i$$

where H denotes the covariance matrix; $\bar{x}$ denotes the mean of various $x_i$ in X; and $\bar{y}$ denotes the mean of various $y_i$ in Y.

Singular value decomposition may then be used to decompose H into $H=USV^T$. Then, the approximate solution of Equation (1) can be obtained as Equation (3):

$$R_{XY}=VU^T, t_{XY}=-R_{XY}\bar{x}+\bar{y} \quad (3)$$

where V and U denote vector matrices, and $R_{XY}$ denotes a rotation matrix; $t_{XY}$ denotes a translation matrix; and T denotes a matrix transpose operator.

Next, paired $y_i$ samples from set Y are found that can be perfectly or otherwise appropriately aligned with the samples in set X. Therefore, it is necessary to learn satisfying mapping model m, reference can be made to Equation (4), and reference can be made to FIG. 9 for the introduction of the solving of Equation (4):

$$m(x_i, Y) = \arg\min_{x} \|R_{XY}x_i + t_{XY} - y_i\| \quad (4)$$

where argmin denotes the minimization operator.

Having introduced the basic principle of determining a second feature, process 800 of determining a second feature will be described below in conjunction with FIG. 8. At block 802, convolutional encoding is performed on coordinates of the reference point cloud based on the reference point cloud. At block 804, the encoded coordinates are determined as the reference feature. At block 806, a low-frequency feature of the target object is determined based on the upsampled first feature. At block 808, a high-frequency feature of the target object is determined based on the upsampled first feature and the reference feature. At block 810, a second feature is determined based on the low-frequency feature and the high-frequency feature.

The reason for introduction of the high-frequency feature and low-frequency feature and the basic principles of implementation are described below. Generally speaking, it is common that convolutional neural networks tend to learn low-frequency information from images, but the generated images are fuzzy. To encourage reconstruction around high-frequency regions, embodiments of the present disclosure use coordinate encoding to expand input point cloud 130 (set X) and reference point cloud 140 (set Y) into a full-band frequency domain. Mathematically, function β is used to calculate coordinates p, as in Equation (5):

$$\beta(p)=(\sin(2^0\pi p),\cos(2^0 rp), \ldots, \sin(2^{L-1}\pi p), \cos(2^{L-1}\pi p)) \quad (5)$$

where L denotes the frequency bandwidth or complexity; and p denotes the coordinates.

This design has the same conceptual principle as the neural tangent kernel (NTK). Embedding coordinates into a multidimensional space can avoid "spectral bias" and force the network to decay slowly in the high-frequency domain. Similarly, embodiments of the present disclosure apply the same encoding scheme to the feature domain, so that the point cloud upsampling can be forced to be frequency-based interpolation. That is, the network learns to insert missing high-frequency features between low-frequency features. Therefore, embodiments of the present disclosure combine low-frequency (LF) encoding and high-frequency (HF) encoding with the features of sparse point clouds and deformed point sets. Given LF feature $F_l$ and predicted HF feature $F_h$, reference can be made to Equation (6):

$$\gamma(F_l)=(\sin(2^0\pi F_l),\cos(2^0\pi F_l), \ldots, \sin(2^{L-1}\pi F_l),\cos(2^{L-1}\pi F_l))$$

$$\gamma(F_h)=(\sin(2^0\pi F_h),\cos(2^0\pi F_h), \ldots, \sin(2^{L-1}\pi F_h),\cos(2^{L-1}\pi F_h))$$

$$F=\text{softmax}(F_l+F_h)\cdot\gamma(F_l)+(1-\text{softmax}(F_l+F_h))\cdot\gamma(F_h) \quad (6)$$

where the low-frequency and high-frequency features are weighted using the softmax function so that the network can automatically adjust their values for optimization. As described previously, the rigid transformation can distort reference point cloud 140 that is close to input point cloud 130. In order to learn the rigid transformation, mapping model m is defined to find matching points. For example, corresponding points can be selected from uniform circle Y. Mathematically, the mapping model m can be characterized as shown in Equation (7):

$$m(x_i,Y)=\text{softmax}(\Phi_Y\Phi_X^T) \quad (7)$$

where $\Phi_Y$ denotes the high-frequency feature matrix of Y; and $\Phi_X^T$ denotes the transpose of the high-frequency feature matrix of X.

In Equation (7), the softmax function is again used to calculate the covariance matrix learned from the cross-attention module. It can be considered as a soft pointer from each $x_i$ to the elements of Y. Then, the matching $\hat{y}_i$ can be found as shown in Equation (8):

$$\hat{y}_i = Y^T m(x_i, Y) \qquad (8)$$

where $\hat{y}_i$ denotes the estimate of $y_i$.

Finally, the matching $\hat{y}_i$ and matching $x_i$ can be used to learn the rigid (translation) transformation in Equation (3). Using the rotation and rigid transformations, the point cloud in reference point cloud 140 can be transformed to:

$$Y_{warp} = R_{XY} y_i + t_{XY}, i=0,1,\ldots,M \qquad (9)$$

where $Y_{warp}$ denotes the position representation after the transformation of $y_i$.

Having described the basic principle of determining a second feature, process 900 of determining a second high-frequency will be described below in conjunction with FIG. 9. At block 902, a first intermediate feature is determined based on the upsampled first feature. At block 904, a second intermediate feature is determined based on the reference feature. At block 906, a third intermediate feature is determined based on the first intermediate feature and the second intermediate feature. At block 908, singular value decomposition is performed on the third intermediate feature to acquire a first parameter set and a second parameter set. At block 910, a high-frequency feature is determined based on the first parameter set and the second parameter set.

In some embodiments, determining a second feature based on the low-frequency feature and the high-frequency feature includes determining a mapping relationship between coordinates of the reference point cloud based on the low-frequency feature and the high-frequency feature; and determining the second feature based on the mapping relationship. In some embodiments, determining the mapping relationship includes matching, for each point in the input point cloud, a corresponding point in the reference point cloud; and determining the mapping relationship based on the matched corresponding point.

In some embodiments, in order to train the transformation model or submodules therein, a variable scale (e.g., expansion factor α) point cloud process is provided. Given a target point cloud, the present disclosure prepares a multi-scale low-resolution point cloud and randomly selects a subset as the input for training. The expansion factor α is used as a label to indicate the training scheme. As the training traverses different upsampling scenarios, deformation model 300 learns meta-information hidden in the point cloud and can self-adaptively optimize the quality of the point cloud.

To learn normal lines from the point cloud, the present disclosure uses a simple plane fitting technique to estimate the normal line of each point. The basic idea is to center local points and then extract feature vectors using principal component analysis (PCA) as normal line estimates. To learn a surface, the present disclosure uses a differential marching cube technique to learn a surface from upsampled points. The grid-to-point distances and beam gap losses are then calculated to ensure that the surface is tight and smooth.

It can be understood that the processes illustrated in FIG. 8 and FIG. 9 can be applied in a machine learning model to increase the accuracy of the model output. The SVD mechanism can be used to more fully learn interrelationships between positions of point clouds and to generate first parameter set R and second parameter set T (or referred to as rotation parameter and translation parameter). The combination of the rotation parameter and the translation parameter with the upsampled first feature can be interpreted as a motion process, wherein this motion process (or the motion process repeated multiple times) can eventually achieve the accurate interpolation of the original point cloud of the target object, thus making the input point cloud collected by the hardware device with limited performance become dense. At the same time, the introduction of high-frequency features and low-frequency features can make it possible to focus on noteworthy features in the entire spectrum. This saves hardware cost without affecting the effect of 3D modeling and is very beneficial for subsequent virtual reality applications.

Figure 10:
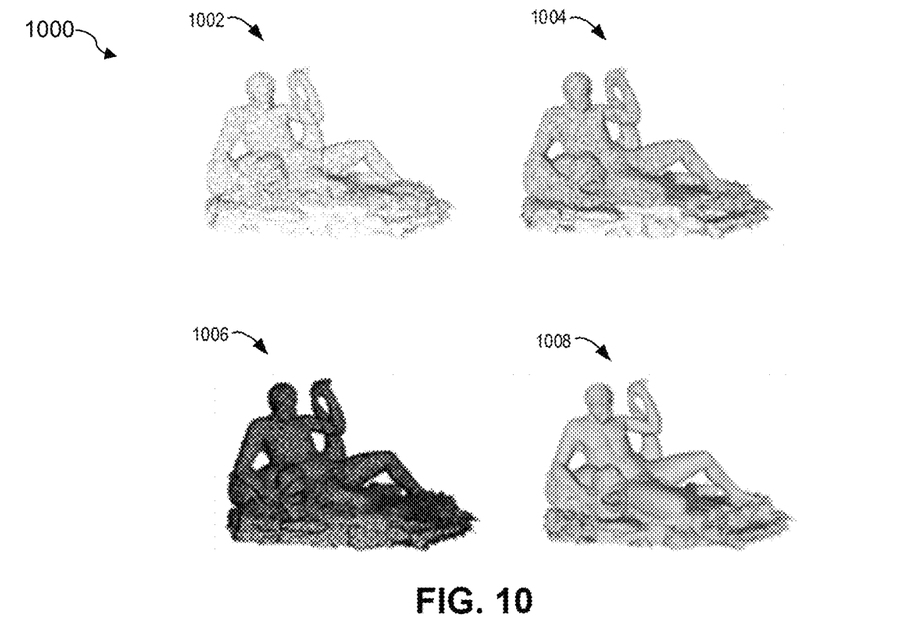
FIG. 10 shows a schematic diagram of comparison between an input point cloud and the generated target object according to an example implementation of the present disclosure.
Figure 11:
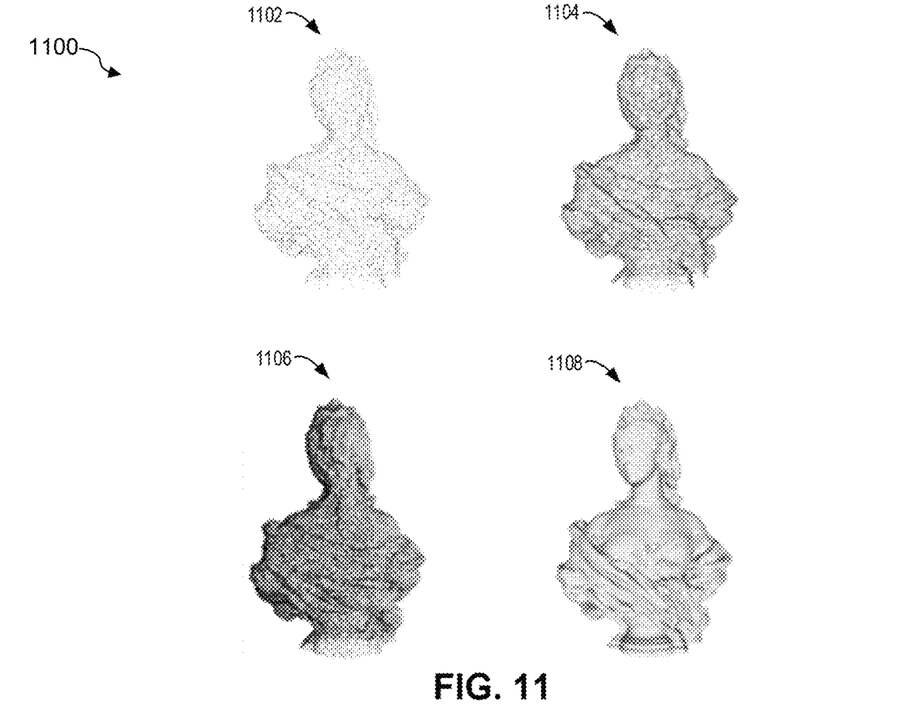
FIG. 11 shows a schematic diagram of comparison between another input point cloud and the generated target object according to an example implementation of the present disclosure.

FIG. 10 shows a schematic diagram of comparison 1000 between an input point cloud and the generated target object according to an example implementation of the present disclosure. FIG. 11 shows a schematic diagram of comparison 1100 between another input point cloud and the generated target object according to an example implementation of the present disclosure.

Comparison 1000 shows an example of input point cloud 130 versus target object 150. Specifically, input point cloud 1002 versus the corresponding point cloud 1004 of which the number of points has been increased, input point cloud 1002 versus the corresponding normal line estimate 1006, and input point cloud 1002 versus the corresponding 3D reconstructed target object 1008 are illustrated. Comparison 1100 shows an example of input point cloud 130 versus target object 150. Specifically, input point cloud 1102 versus the corresponding point cloud 1104 of which the number of points has been increased, input point cloud 1102 versus the corresponding normal line estimate 1106, and input point cloud 1102 versus the corresponding 3D reconstructed target object 1108 are illustrated.

As can be seen, with method 200 of the present disclosure, the input point cloud is processed to obtain a denser point cloud with smooth edges and no abnormally protruding points. This allows more details of an object to be shown, and meanwhile, it is quite useful for subsequent applications. Method 200 can also implement estimation of normal lines and direct 3D reconstruction of the target object.

With method 200 of the present disclosure for generating a target object, the features of the target object can be learned and used to guide the deformation of the reference point cloud, so as to achieve the interpolation of the point cloud of the target object. The obtained interpolated value is of high quality and has a strong anti-noise capability. In addition, method 200 can improve the accuracy of normal line estimation and the accuracy of surface reconstruction, thus improving the effect of 3D reconstruction. Further, the degree of the number of interpolated points in the point cloud of the target object can be changed simply, in time, and at any time by parameter a.

Figure 12:
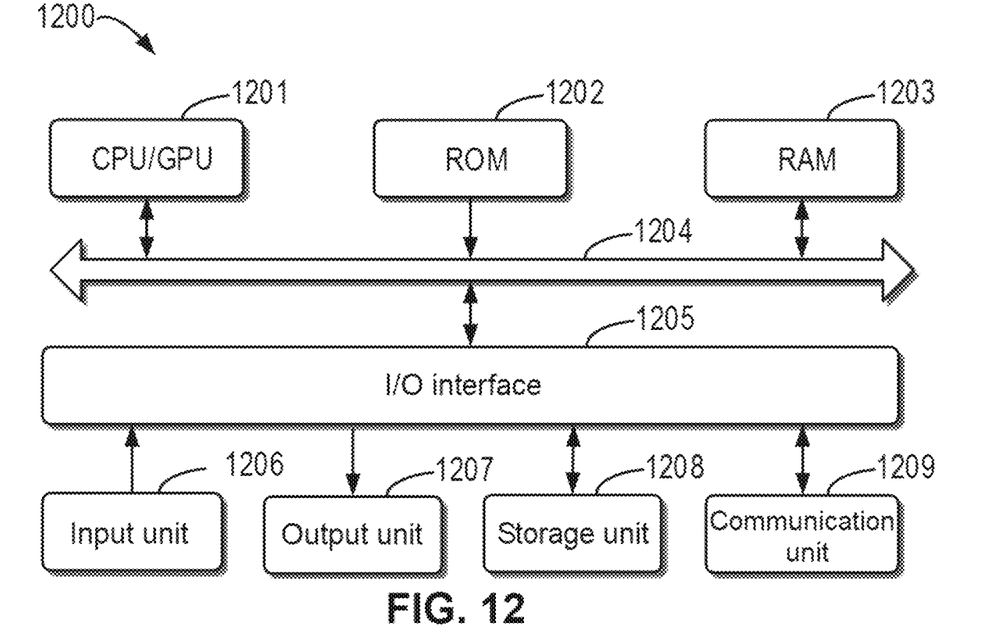
FIG. 12 shows a block diagram of a device for generating a target object according to an example implementation of the present disclosure.

FIG. 12 shows a schematic block diagram of device 1200 that may be used to implement embodiments of the present disclosure. Device 1200 may be the device or apparatus described in embodiments of the present disclosure. As shown in FIG. 12, device 1200 includes central processing unit/graphics processing unit (CPU/GPU) 1201 that may perform various appropriate actions and processing according to computer program instructions stored in read-only memory (ROM) 1202 or computer program instructions loaded from storage unit 1208 into random access memory (RAM) 1203. In RAM 1203, various programs and data required for the operation of device 1200 may also be stored.

CPU/GPU 1201, ROM 1202, and RAM 1203 are connected to each other through bus 1204. Input/output (I/O) interface 1205 is also connected to bus 1204. Although not shown in FIG. 12, device 1200 may also include a co-processor.

A plurality of components in device 1200 are connected to I/O interface 1205, including: input unit 1206, such as a keyboard and a mouse; output unit 1207, such as various types of displays and speakers; storage unit 1208, such as a magnetic disk and an optical disc; and communication unit 1209, such as a network card, a modem, and a wireless communication transceiver. Communication unit 1209 allows device 1200 to exchange information/data with other devices over a computer network such as the Internet and/or various telecommunication networks.

The various methods or processes described above may be performed by CPU/GPU 1201. For example, in some embodiments, the method may be implemented as a computer software program that is tangibly included in a machine-readable medium, such as storage unit 1208. In some embodiments, part or all of the computer program may be loaded and/or installed onto device 1200 via ROM 1202 and/or communication unit 1209. When the computer program is loaded into RAM 1203 and executed by CPU/GPU 1201, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method for generating a target object, comprising:
   upsampling a first feature of an input point cloud;
   determining a reference feature of a reference point cloud having a predetermined shape;
   determining a second feature based on the upsampled first feature and the reference feature; and
   generating a three-dimensional target object based on the second feature and the input point cloud, wherein the target object has a fitted curved surface, and the target object has a greater number of points than the input point cloud;
   wherein in determining the second feature based on the upsampled first feature and the reference feature, a deformation of the reference feature is performed utilizing the upsampled first feature; and
   wherein said method for generating said target object is performed by at least one computing device comprising at least one processor that is coupled to a memory.

2. The method according to claim 1, further comprising:
   generating an iterated target object based on the upsampled first feature and a point cloud of the target object, wherein the iterated target object and the target object have the same or different numbers of points in their respective point clouds.

3. The method according to claim 1, further comprising:
   scanning the target object by a hardware device to acquire the input point cloud;
   performing convolutional encoding on coordinates of the input point cloud based on the acquired input point cloud; and
   determining the encoded coordinates as the first feature.

4. The method according to claim 3, wherein the hardware device comprises a laser radar.

5. The method according to claim 1, wherein upsampling a first feature of an input point cloud comprises:
   upsampling the first feature multiple times; and
   causing the dimension of the upsampled first feature to be the same as the dimension of the reference feature.

6. The method according to claim 1, wherein determining the second feature comprises:
   performing convolutional encoding on coordinates of the reference point cloud based on the reference point cloud;
   determining the encoded coordinates as the reference feature;
   determining a low-frequency feature of the target object based on the upsampled first feature;
   determining a high-frequency feature of the target object based on the upsampled first feature and the reference feature; and
   determining the second feature based on the low-frequency feature and the high-frequency feature.

7. The method according to claim 6, wherein determining a high-frequency feature of the target object based on the upsampled first feature and the reference feature comprises:
   determining a first intermediate feature based on the upsampled first feature;
   determining a second intermediate feature based on the reference feature;
   determining a third intermediate feature based on the first intermediate feature and the second intermediate feature;
   performing a singular value decomposition on the third intermediate feature to acquire a first parameter set and a second parameter set; and
   determining the high-frequency feature based on the first parameter set and the second parameter set.

8. The method according to claim 6, wherein determining the second feature based on the low-frequency feature and the high-frequency feature comprises:
   determining a mapping relationship between coordinates of the reference point cloud based on the low-frequency feature and the high-frequency feature; and
   determining the second feature based on the mapping relationship.

9. The method according to claim 8, wherein determining the mapping relationship comprises:
   matching, for each point in the input point cloud, a corresponding point in the reference point cloud; and
   determining the mapping relationship based on the matched corresponding point.

10. An electronic device, comprising:
    at least one processor; and
    a memory coupled to the at least one processor, wherein the memory has instructions stored therein which, when executed by the at least one processor, cause the electronic device to execute actions comprising:
    upsampling a first feature of an input point cloud;
    determining a reference feature of a reference point cloud having a predetermined shape;
    determining a second feature based on the upsampled first feature and the reference feature; and
    generating a three-dimensional target object based on the second feature and the input point cloud, wherein the target object has a fitted curved surface, and the target object has a greater number of points than the input point cloud;
    wherein in determining the second feature based on the upsampled first feature and the reference feature, a deformation of the reference feature is performed utilizing the upsampled first feature.

11. The electronic device according to claim 10, wherein the actions further comprise:
    generating an iterated target object based on the upsampled first feature and a point cloud of the target object, wherein the iterated target object and the target object have the same or different numbers of points in their respective point clouds.

12. The electronic device according to claim 10, wherein the actions further comprise:
 scanning the target object by a hardware device to acquire the input point cloud;
 performing convolutional encoding on coordinates of the input point cloud based on the acquired input point cloud; and
 determining the encoded coordinates as the first feature.

13. The electronic device according to claim 12, wherein the hardware device comprises a laser radar.

14. The electronic device according to claim 10, wherein upsampling a first feature of an input point cloud comprises:
 upsampling the first feature multiple times; and
 causing the dimension of the upsampled first feature to be the same as the dimension of the reference feature.

15. The electronic device according to claim 10, wherein determining the second feature comprises:
 performing convolutional encoding on coordinates of the reference point cloud based on the reference point cloud;
 determining the encoded coordinates as the reference feature;
 determining a low-frequency feature of the target object based on the upsampled first feature;
 determining a high-frequency feature of the target object based on the upsampled first feature and the reference feature; and
 determining the second feature based on the low-frequency feature and the high-frequency feature.

16. The electronic device according to claim 15, wherein determining a high-frequency feature of the target object based on the upsampled first feature and the reference feature comprises:
 determining a first intermediate feature based on the upsampled first feature;
 determining a second intermediate feature based on the reference feature;
 determining a third intermediate feature based on the first intermediate feature and the second intermediate feature;
 performing a singular value decomposition on the third intermediate feature to acquire a first parameter set and a second parameter set; and
 determining the high-frequency feature based on the first parameter set and the second parameter set.

17. The electronic device according to claim 15, wherein determining the second feature based on the low-frequency feature and the high-frequency feature comprises:
 determining a mapping relationship between coordinates of the reference point cloud based on the low-frequency feature and the high-frequency feature; and
 determining the second feature based on the mapping relationship.

18. The electronic device according to claim 17, wherein determining the mapping relationship comprises:
 matching, for each point in the input point cloud, a corresponding point in the reference point cloud; and
 determining the mapping relationship based on the matched corresponding point.

19. A computer program product tangibly stored on a non-transitory computer-readable medium and including computer-executable instructions that, when executed by a device, cause the device to execute a method for generating a target object, the method comprising:
 upsampling a first feature of an input point cloud;
 determining a reference feature of a reference point cloud having a predetermined shape;
 determining a second feature based on the upsampled first feature and the reference feature; and
 generating a three-dimensional target object based on the second feature and the input point cloud, wherein the target object has a fitted curved surface, and the target object has a greater number of points than the input point cloud;
 wherein in determining the second feature based on the upsampled first feature and the reference feature, a deformation of the reference feature is performed utilizing the upsampled first feature.

20. The computer program product according to claim 19, wherein the method further comprises:
 generating an iterated target object based on the upsampled first feature and a point cloud of the target object, wherein the iterated target object and the target object have the same or different numbers of points in their respective point clouds.

* * * * *